United States Patent [19]
Phelan

[11] 3,800,984
[45] Apr. 2, 1974

[54] SAMPLER AND DILUTER
[75] Inventor: Charles Stephens Phelan, Tustin, Calif.
[73] Assignee: Rohe' Scientific Corporation, Santa Ana, Calif.
[22] Filed: Nov. 26, 1971
[21] Appl. No.: 202,370

[52] U.S. Cl.............. 23/259, 23/253 R, 222/137, 222/148
[51] Int. Cl............................................ B67d 5/52
[58] Field of Search........... 23/259, 253 R; 222/148, 222/137

[56] References Cited
UNITED STATES PATENTS

| | | | |
|---|---|---|---|
| 3,178,266 | 4/1965 | Anthon | 23/253 R |
| 3,186,800 | 6/1965 | Strickler | 23/253 R |
| 3,193,358 | 7/1965 | Barvch | 23/253 R |
| 3,197,285 | 7/1965 | Rosen | 23/253 R |
| 3,666,420 | 5/1972 | Paatzsch | 23/253 R |
| 3,401,839 | 9/1968 | Christie | 222/137 |

Primary Examiner—Robert M. Reese
Attorney, Agent, or Firm—Harris, Kern, Wallen & Tinsley

[57] ABSTRACT

An automatic apparatus for discharging metered volumes of a sample and a diluent. The apparatus includes a positive displacement sample pump for drawing a metered sample into a sample inlet and includes a positive displacement diluent pump for simultaneously drawing a metered volume of diluent into a diluent inlet. Subsequently, the two pumps simultaneously discharge the metered sample and the metered volume of diluent from the sample inlet. The diluent inlet, the two pumps and the sample inlet are connected in series in such a way that there is through flow of the diluent from the diluent inlet to the sample inlet without any dead ends. With this construction, the apparatus constantly purges itself of air to avoid air accumulations which might lead to inaccuracies in metering the sample and/or the diluent.

6 Claims, 2 Drawing Figures

PATENTED APR 2 1974 3,800,984

SAMPLER AND DILUTER

BACKGROUND OF INVENTION

The present invention relates in general to an apparatus for dispensing metered volumes of a liquid sample and a diluent for the sample. The invention is particularly applicable to the field of precision pipetting and will be considered in such connection herein for convenience.

Heretofore, accurate pipetting and dilution of liquid samples, such as blood samples, has necessitated manual pipetting of the sample and dispensing of the diluent, thereby rendering the procedure very time consuming. Prior attempts at automated pipetting and diluting of samples have not been very successful because of such problems as fragmentation of the specimens due to harsh mechanical action, inaccuracies resulting from the introduction of air into the system, and the like.

The present invention overcomes these and other problems encountered with prior apparatus, while achieving a precision comparable to that obtainable with the finest manual techniques, and a speed greater than that attainable by a skilled technician.

SUMMARY AND OBJECTS OF INVENTION

With the foregoing background in mind, the primary object of the present invention is to provide a sampler and diluter which is self purging to avoid air accumulations, which acts gently on the sample and the diluent to avoid fragmentation, and the like.

More particularly, a primary object of the invention is to provide a sampler and diluter which include positive displacement sample and diluent pumps for concurrently drawing a metered sample into a sample inlet and a metered volume of diluent into a diluent inlet, and for then concurrently discharging the metered sample and the metered volume of diluent from the sample inlet, the pumping action in each instance being devoid of any harsh mechanical action, and the two inlets and the two pumps being so interconnected as to render the apparatus self purging to avoid air accumulations.

Still more particularly, an important object of the invention is to provide a sampler and diluter wherein the sample and diluent pumps are so connected in series with the diluent and sample inlets that there is through flow of the diluent from the diluent inlet to the sample inlet without any dead ends, thereby rendering the apparatus self purging and avoiding any air accumulations which could lead to inaccuracies.

The invention may be summarized as including, and another important object is to provide a sampler and diluter which includes: a sample pump comprising a sample chamber having a sample piston extending thereinto; a diluent pump comprising a diluent chamber having a diluent piston extending thereinto; means for displacing the sample and diluent pistons into and out of the sample and diluent chambers in unison; a sample inlet connected to the sample chamber; a valve interconnecting the sample and diluent chambers; means for opening the valve during movement of the sample and diluent pistons into the sample and diluent chambers; a diluent inlet connected to the diluent chamber; and a check valve in the diluent inlet and permitting flow therethrough into the diluent chamber.

With the foregoing construction, the diluent flows from the diluent inlet through the diluent chamber and the sample chamber to the sample inlet so that the system is continuously purged of any air that may enter. A related object is to make the sample and diluent chambers transparent so that the presence of air can be detected readily and eliminated by continuous operation of the unit until its self-purging action disposes of the air. A further object is to slant or dome the tops of the two chambers to avoid air entrapment.

A further object is to provide means for independently adjusting the strokes of the two pistons to independently adjust the diluent and sample volumes.

Another object of the invention is to provide a sample inlet which includes a pipette formed of a nonwettable plastic. This eliminates any opportunity for breakage and permits the complete expulsion of the sample with no part thereof adhering to either the inside or the outside of the pipette. However, a calibrated glass pipette may be substituted to provide a way of obtaining exact sample volume settings.

The foregoing objects, advantages, features and results of the present invention, together with various other objects, advantages, features and results which will be evident to those skilled in the art to which the invention relates in the light of this disclosure, may be achieved with the exemplary embodiment of the invention described in detail hereinafter and illustrated in the accompanying drawing.

DETAILED DESCRIPTION OF EXEMPLARY EMBODIMENT OF INVENTION

Figure 2:
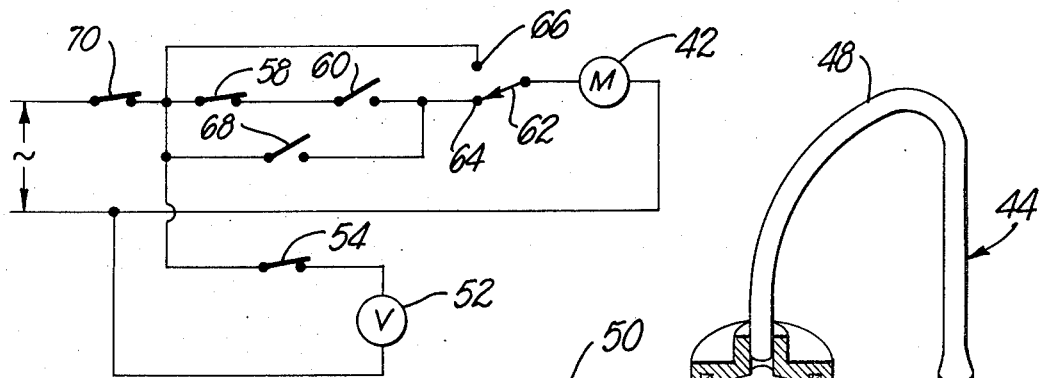
FIG. 2 is a schematic wiring diagram of the unit.
Figure 1:
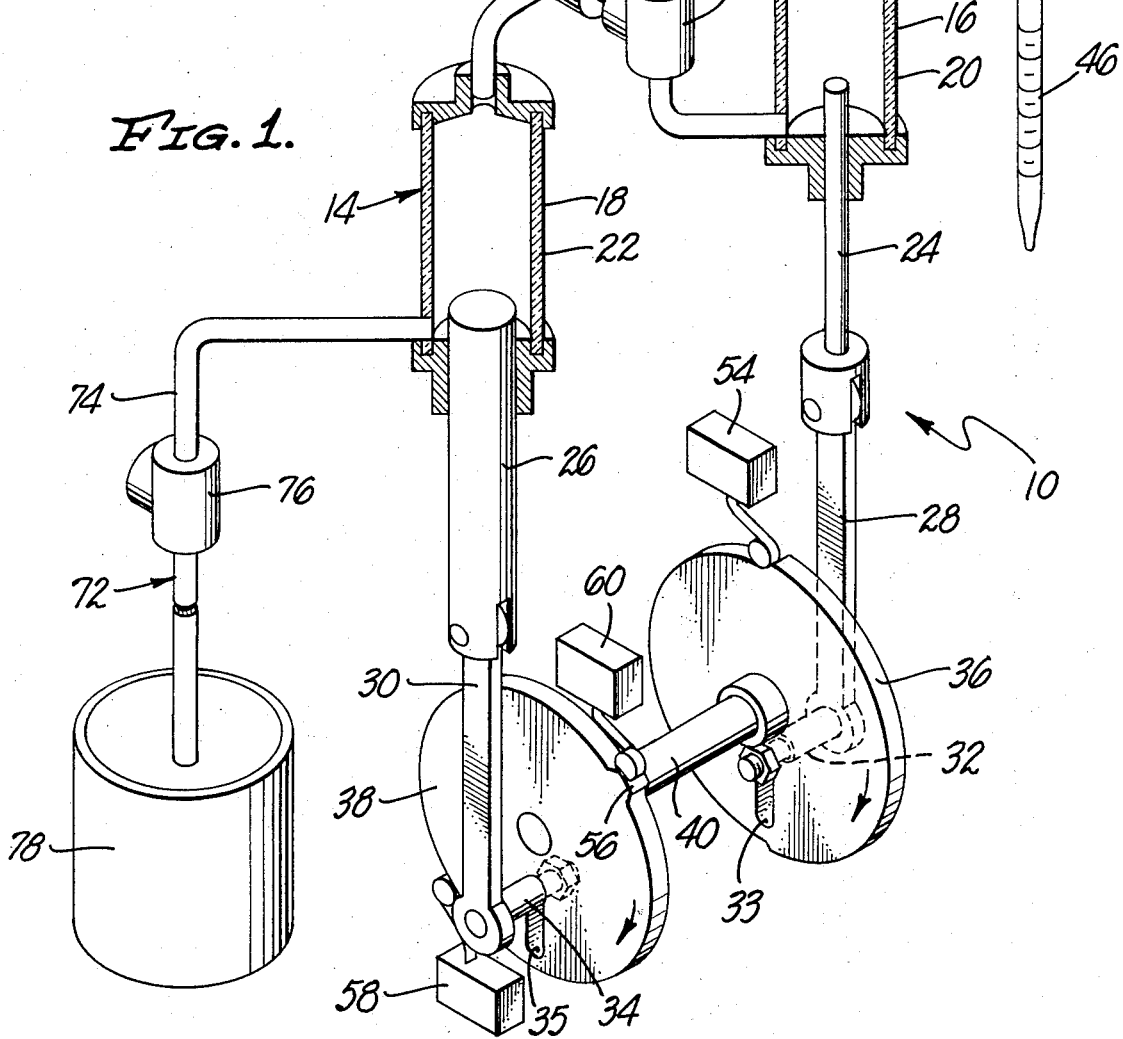
FIG. 1 is a diagrammatic isometric view illustrating the sampler and diluter of the invention.

Referring to the drawing, the sampler and diluter of the invention illustrated diagrammatically therein is designated generally by the numeral 10 and includes positive displacement, reciprocatory sample and diluent pumping means or pumps 12 and 14. These pumps respectively include sample and diluent chambers 16 and 18 having transparent cylindrical walls 20 and 22.

Sample and diluent pistons 24 and 26 extend axially into the respective sample and diluent chambers 16 and 18 and are respectively connected by connecting rods 28 and 30 to crank pins 32 and 34 on cams 36 and 38 carried by a shaft 40 driven by a motor 42, FIG. 2. The crank pins 32 and 34 are aligned so that the sample and diluent pistons 24 and 26 are displaced axially inwardly and axially outwardly of their respective chambers 16 and 18 in unison, and the crank pins are adjustably mounted in radial slots 33 and 35 to permit independently varying the displacements of the pistons 24 and 26, and thus the sample and diluent volumes. Preferably, the sample and diluent chambers 16 and 18 are vertically oriented with the sample and diluent pistons 24 and 26 extending upwardly through the lower ends thereof.

The sampler and diluter 10 includes a sample inlet 44 connected to the upper end of the sample chamber 16. Preferably, the sample inlet 44 comprises a pipette 46 removably connected to a tubing 48 leading to the upper end of the sample cylinder. As previously indicated, the pipette 46 is preferably made of a non-wettable plastic. However, for the purpose of checking the sample volume setting, a calibrated glass pipette may be used, as shown.

The lower end of the sample chamber 16 is connected to the upper end of the diluent chamber 18 by a tubing 50 having therein a normally closed solenoid valve 52. The solenoid valve 52 may be of any conventional type having an external solenoid connected to an internal movable valve element. The latter is adapted to be opened by closure of a switch 54 by the cam 36. This cam closes the switch 54 during the upward, pumping or exhaust strokes of the sample and diluent pistons 24 and 26. During the downward, intake strokes of these pistons, the cam 36 opens the switch 54 so that the valve 52 is closed.

The cam 38 is provided with projection 56 which acts on diametrically opposed switches 58 and 60 connected in series. The motor 42 is connectable in series with the switches 58 and 60 when a selector switch 62 is in engagement with contact 64, this selector switch also being engageable with a contact 66 to bypass the switches 58 and 60. When the selector switch 62 is in the position shown in FIG. 2, the motor 42 is connected in series with the switches 58 and 60. Thus, when the projection 56 engages the switch 60, the motor is stopped with the pistons 24 and 26 at the lower ends of their strokes. Conversely, when the projection 56 on the cam 38 engages the switch 58, the motor 42 is stopped with the pistons 24 and 26 at the upper ends of their strokes. The motor 42 may be restarted by closure of a manual switch 68 in parallel with the switches 58 and 60. With the selector switch 62 in engagement with the contact 66, the motor 42 will run continuously for a reason to be discussed. To complete the description of the circuit of the sampler and diluter 10, it also includes a main switch 70.

Connected to the lower end of the diluent chamber 18 of the sampler and diluter 10 is a diluent inlet 72 comprising a tubing 74 having therein a check valve 76 which permits flow into the diluent chamber 18, but which prevents reverse flow. The tubing 74 may extend downwardly into any suitable diluent source 78.

The tops of the sample and diluent chambers 16 and 18 are upwardly sloped or domed, as shown, and the tubings 48 and 50 are connected to the chambers 16 and 18 at the tops of such slopes, thereby avoiding air entrapment, an important feature.

OPERATION OF INVENTION

The sampler and diluter 10 is self-priming so that, when placing it in operation initially, it is merely necessary to place the tubing 74 in the diluent container 78 and operate the motor 42 continuously, the selector switch 62 being in engagement with the contact 66 to achieve this, until the system has been purged of air. The complete elimination of air is readily observed through the transparent walls 20 and 22 of the sample and diluent chambers 16 and 18, the various tubings also preferably being transparent for this purpose.

It will be noted that since the diluent flows from the diluent inlet 72 through the diluent and sample pumps 12 and 14 to the sample inlet 44 in what might be termed a straight line with no dead ends, the unit constantly purges itself of air to avoid air accumulations which might lead to inaccuracies in metering by the sample and diluent pumps.

Once the sampler and diluter 10 has been primed and all air has been eliminated in the foregoing manner, the selector switch 62 is placed in engagement with the contact 64 and the unit is stopped with the pistons 24 and 26 at the upper ends of their strokes, this occurring automatically upon opening of the switch 58. The pipette 46 is then immersed in the desired sample, not shown, and the unit 10 is started by closure of the manual switch 68. This causes the sample and diluent pistons 24 and 26 to move downwardly to the lower ends of their strokes, the valve 52 being closed. Under these conditions, the sample piston 24 draws a metered sample into the pipette 46, while the diluent piston 26 draws a metered volume of diluent into the diluent inlet 72, the check valve 76 automatically opening to permit this. Normally, the cross-sectional area of the sample piston 24 will be less than that of the diluent piston 26 so that the diluent volume is greater than the sample volume.

Next, the operator of the unit 10 closes the manual switch 68 momentarily, whereupon the pistons 24 and 26 move upwardly through their discharge strokes, the valve 52 being open and the check valve 76 closing automatically. Under these conditions, the pistons 24 and 26 expel the metered sample and the metered volume of diluent from the pipette 46 into any desired container, not shown. Since the pipette 46 is non-wettable, none of the sample adheres thereto. It will be understood that the volume of the sample is less than the volume of the pipette 46 so that none of the sample ever enters the sample pump 12.

It will be noted that, throughout the foregoing sampling and diluting cycle, the unit is subject to through flow of the diluent from the diluent inlet 72 to the sample inlet 44. Since the sample and diluent chambers 16 and 18 are connected in series with the sample and diluent inlets, there is through flow of the diluent without any dead ends to trap air. Consequently, the unit constantly purges itself of air to avoid air accumulations which might lead to inaccuracies in the metering of the sample and/or the diluent by the sample and diluent pistons 24 and 26.

Preferably, the speeds of the sample and diluent pistons 24 and 26 are relatively low to avoid any harsh mechanical action which might result in fragmentation of the specimen. For example, the complete sampling and diluting cycle may require of the order of six seconds or so. However, it will be noted that this time interval is nevertheless so short that several sampling and diluting operations can be carried out per minute.

Although an exemplary embodiment of the invention has been disclosed for purposes of illustration, it will be understood that various changes, modifications and substitutions may be incorporated in such embodiment without departing from the spirit of the invention as defined by the claims appearing hereinafter.

I claim:

1. In a sampler and diluter, the combination of:
   a. a first pump, having a first pump chamber therein comprising spaced end walls and a side wall, and having a first piston extending into said first chamber through one of said end walls thereof and spaced from said side wall thereof and reciprocable to provide suction and displacement strokes of said first piston, and said first chamber having a first inlet at one end and a first outlet at its other end;

b. a second pump, having a second pump chamber therein also comprising spaced end walls and a side wall, and having a second piston extending into said second chamber through one of said end walls thereof and spaced from said side wall thereof and reciprocable to provide suction and displacement strokes of said second piston, and said second chamber having a second inlet at one end and a second outlet at its other end, said first outlet of said first pump being connected to said second inlet of said second pump by a liquid passage, the liquid volume displaced by said first pump being substantially greater than the volume displaced by said second pump;

c. a check valve in said first inlet of said first pump;

d. second valve means in said passage between said pumps;

e. actuating means interconnecting said pistons and operable to move said pistons in unison together on their suction strokes and in unison together on their displacement strokes; and f. means for operating said second valve means in response to and in timed relation to said actuating means whereby said check valve is opened and said second valve means is closed on each of said suction strokes and whereby said check valve is closed and said second valve means is opened on each of said displacement strokes, so that during each of said suction strokes a liquid is drawn through said check valve and said first inlet into said first pump chamber and a liquid is drawn into said second outlet of said second pump, and so that during each of said displacement strokes liquid is displaced by said first pump from said first pump chamber into and through said second pump chamber while said second pump also displaces liquid from said second pump chamber through said second outlet.

2. A sampler and diluter as defined in claim 1 in which said side walls of said first and second chambers are transparent.

3. A sampler and diluter as defined in claim 1 in which said actuating means is an electric motor, and said device has control means for controlling the operation of the device, including an electric circuit connected to said motor and a power source, manual switch means in said circuit between said motor and said source for manually opening or closing said circuit, first automatic switch means in said circuit for automatically opening said circuit when said pistons are at the inner ends of their suction strokes, and second automatic switch means in said circuit for automatically opening said circuit when said pistons are at the outer ends of their displacement strokes.

4. A sampler and diluter as defined in claim 1 wherein said means for operating said second valve means includes an externally powered actuator connected to said second valve means.

5. A sampler and diluter according to claim 1 wherein:

a. said first and second chambers are generally vertical with said one end wall thereof lowermost;

b. said first and second pistons respectively extend upwardly through the lower end walls of and into said first and second chambers;

c. said first and second inlets respectively communicate with the lower ends of said first and second chambers; and d. said first and second outlets respectively communicate with the upper ends of said first and second chambers.

6. A sampler and diluter as set forth in claim 5 wherein the lower sides of the upper end walls of said first and second chambers are upwardly domed and said first and second outlets respectively communicate with said first and second chambers through said upper end walls of said first and second chambers.

* * * * *